United States Patent
Bank

(10) Patent No.: US 9,354,057 B2
(45) Date of Patent: May 31, 2016

(54) ELECTRONIC ROD READER AND FIELD NOTEBOOK

(71) Applicant: Trimble Navigation Limited, Sunnyvale, CA (US)

(72) Inventor: Michael Bank, Beavercreek, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 56 days.

(21) Appl. No.: 14/498,356

(22) Filed: Sep. 26, 2014

(65) Prior Publication Data

US 2016/0091312 A1   Mar. 31, 2016

(51) Int. Cl.
*G01C 15/02* (2006.01)
*G01C 15/00* (2006.01)

(52) U.S. Cl.
CPC .................................... *G01C 15/006* (2013.01)

(58) Field of Classification Search
CPC ................................ G01C 15/02; G01C 15/06
USPC ..................... 33/227, 228, 290, 293, 294, 297
See application file for complete search history.

(56) References Cited

U.S. PATENT DOCUMENTS

| | | | | |
|---|---|---|---|---|
| 4,023,908 A | * | 5/1977 | Johnson | G01C 15/004 33/293 |
| 5,457,890 A | * | 10/1995 | Mooty | G01C 15/002 33/293 |
| 7,644,505 B2 | | 1/2010 | Zeng et al. | |
| 8,537,216 B2 | | 9/2013 | Guertler et al. | |
| 2007/0289152 A1 | | 12/2007 | Zeng et al. | |
| 2010/0134617 A1 | | 6/2010 | Guertler et al. | |
| 2012/0182418 A1 | * | 7/2012 | Kumagai | G01C 5/00 348/137 |
| 2012/0203502 A1 | * | 8/2012 | Hayes | G01C 15/002 702/155 |
| 2012/0320340 A1 | | 12/2012 | Coleman et al. | |
| 2013/0008038 A1 | * | 1/2013 | Nagao | G01C 15/06 33/366.11 |
| 2013/0269195 A1 | | 10/2013 | Matsumoto et al. | |
| 2013/0276315 A1 | * | 10/2013 | Kahle | G01C 15/06 33/228 |

(Continued)

FOREIGN PATENT DOCUMENTS

| | | |
|---|---|---|
| EP | 1593935 A1 | 11/2005 |
| EP | 1726915 A1 | 11/2006 |
| EP | 2518439 A2 | 10/2012 |

OTHER PUBLICATIONS

PCT/US2015/052007 International Search Report, Nov. 20, 2015, pp. 1-14.

(Continued)

*Primary Examiner* — G. Bradley Bennett
(74) *Attorney, Agent, or Firm* — Kilpatrick Townsend & Stockton LLP

(57) ABSTRACT

An electronic rod reader and field notebook is disclosed. In one embodiment, the electronic rod reader and field notebook comprises an image capture device for capturing an image through the eyepiece of an auto-level. The electronic rod reader and field notebook further comprises logic implemented by a processor of the electronic rod reader for automatically recognizing a crosshair viewed through the eyepiece of the auto-level, for automatically comparing the crosshair against a scale of a standard grade rod viewed through the eyepiece of the auto-level, and for automatically determining an elevation of the standard grade rod based upon the comparing. The electronic rod reader and field notebook further comprises a non-transitory computer readable data storage medium coupled with the processor for storing the elevation as a first reading.

20 Claims, 11 Drawing Sheets

(56) References Cited

U.S. PATENT DOCUMENTS

| | | |
|---|---|---|
| 2013/0278759 A1 | 10/2013 | Zimmermann et al. |
| 2013/0313315 A1* | 11/2013 | Amor .................... G01C 15/02 235/375 |
| 2014/0360031 A1* | 12/2014 | Kahlow ................. G01C 15/06 33/228 |
| 2015/0185008 A1* | 7/2015 | Nishita ................ G01C 15/002 33/293 |
| 2015/0316374 A1* | 11/2015 | Winter ................ G01C 15/006 33/293 |
| 2016/0012590 A1* | 1/2016 | McFadden ............... G01V 8/00 382/106 |

OTHER PUBLICATIONS

PCT/US2015/052013 International Search Report, Jan. 7, 2016, pp. 1-12.

* cited by examiner

ELECTRONIC ROD READER AND FIELD NOTEBOOK

BACKGROUND

An automatic level, or "auto-level" is an optical instrument used in construction and surveying tasks. In use, the device is approximately leveled using three legs. Once the device is approximately level, the optics are self-leveling in that they are hung like a pendulum within the device. An assistant moves to various locations at a site with a grade rod having a scale printed on it and the operator of the auto-level reads the scale through the eyepiece of the auto-level. The number on the scale is subtracted from the known elevation of the auto-level to determine the elevation at the point where the grade rod is located. The auto-level is used to manage elevations, move elevations for construction and earthmoving projects, and to determine elevations for cuts and fills at construction sites.

The use of auto-levels is problematic in there can be some error in reading the scales printed on the grade rods. More specifically, not every line on the scale of the grade rod is dimensioned so there is some degree of operator skill needed to properly determine the elevation of the location at which the grade rod is located. Furthermore, the readings from the auto-level are entered into a field-book which lists the location and elevations read using the auto-level. In some instances, math errors have resulted in incorrect readings being recorded in the field-book. The field-books are retained both for the project at hand as well as to verify that the readings were and made and other legal reasons. However, reading the field-book by various operators is not always error free both in reading the notes associated with the elevations, but the actual dimensions recorded using the auto-level. As more than one worker may be operating the auto-level on various days of a project, it can be difficult for everyone working on the project to derive the same information from reading the field-book. Additionally, the operator of the auto-level is in communication with assistant holding the grade rod. The assistant frequently plants stakes in the ground where the reading was taken having information such as, "Cut 2 meters," printed on the stake. Equipment operators at the site will then perform earthmoving operations in accordance with the instructions printed on the stake. However, in some instances communications between the operator of the auto-level and the assistant at the grade rod are impeded and incorrect instructions are then printed on the stake.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "capturing," "recognizing," "comparing," "determining," "storing," "using," "receiving," "conveying," and "estimating" to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Figure 1:
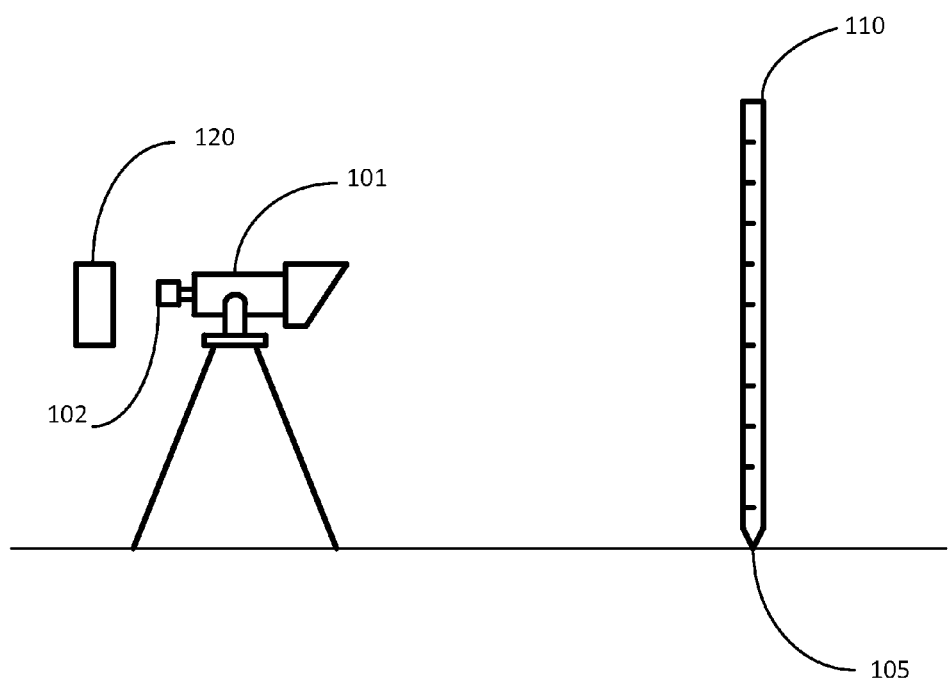
FIG. 1 shows an example use of an electronic rod reader and field notebook in accordance with various embodiments.

FIG. 1 shows an example use of an electronic rod reader and field notebook in accordance with various embodiments. In FIG. 1, an auto-level 101 comprising an eyepiece 102 is set up to allow view of the standard grade rod 110 through the eyepiece 102. It should be appreciated that the term "standard grade rod" as used herein is synonymous and interchangeably usable with the term "grade rod," the term "grading rod," or the term "leveling rod." Typically, standard grade rod 110 is first set over a point (e.g., point 105) having a known elevation (i.e., a "benchmark" elevation). A reading that is typically called a "backsight" is taken by reading the standard grade rod 110 through eyepiece 102 when standard grade rod 110 it is positioned over the first set point. The reading of standard grade rod 110 is then added to the known elevation of point 105, and the height of auto-level 101 (e.g., the elevation of the crosshair viewed when looking though the eyepiece) above the ground is then known. The elevation of a new location can be determined by putting standard grade rod 110 at the new location, looking through eyepiece 102, and reading the scale printed on standard grade rod 110. That value is then subtracted from the height of auto-level 101 and the elevation of the new location is known. If a desired elevation is known, the difference between the elevation of the point just measured and the desired elevation can be calculated for a cut/fill operation. For the purposes of the present application, the term "standard grade rod" is intended to mean a grade rod not having special characters which can only be read by a computer. In other words, a standard grade rod (e.g., standard grade rod 110) has characters and markings which can be read by a human as is the case with most grade rods currently in use.

Also shown in FIG. 1 is electronic rod reader and field notebook 120 which is used in various embodiments to read standard grade rod 110 and to record the elevation data, as well as other pertinent data. In accordance with various embodiments, electronic rod reader and field notebook 120 is configured to automatically recognize a crosshair viewed through eyepiece 102 and to automatically compare that crosshair against the scale displayed on standard grade rod 110. In other words, electronic rod reader and field notebook 120 automatically determines which mark of the scale displayed on standard grade rod 110 is most closely aligned with the crosshairs displayed in eyepiece 102. Electronic rod reader and field notebook 120 is further configured to recognize the characters printed on standard grade rod 110 and to use this information to automatically determine a dimension which is subtracted from the known elevation of auto-level 101 to determine an elevation of the location at which standard grade rod 110 is located. For example, if the elevation of auto-level 101 is 100 meters, and the dimension read off of standard grade rod 110 is 2 meters, electronic rod reader and field notebook 120 can determine that the elevation of the location at which standard grade rod 110 is located is 98 meters. In accordance with various embodiments, electronic rod reader and field notebook 120 is configured to automatically store this data in a non-volatile data storage device.

As will be described in greater detail below, electronic rod reader and field notebook 120 can be a dedicated device configured to read the dimensions off of standard grade rod 110 through eyepiece 102. In accordance with at least one embodiment, electronic rod reader and field notebook 120 comprises a portable electronic device which is not originally configured to be used as a surveying device, or to perform the operations described above. For example, in accordance with at least one embodiment, electronic rod reader and field notebook 120 comprises a cellular telephone which has been configured to perform the above described operations using logic implemented by a processor of electronic rod reader and field notebook 120. In accordance with various embodiments, electronic rod reader and field notebook 120 comprises a wireless communication device which can be used, for example, to communicate with a device operated by the assistant who is holding standard grade rod 110. Thus, an operator of electronic rod reader and field notebook 120 can send messages to the assistant using standard grade rod 110 with instructions such as what message to write on a stake to be placed at the location at which standard grade rod 110 is currently located (e.g., "Cut 2 meters"). Furthermore, if the assistant using standard grade rod 110 has an electronic device configured with a Global Navigation Satellite System (GNSS) receiver, the assistant can send the geographic coordinates of the location at which standard grade rod 110 is located to electronic rod reader and field notebook 120. This information can be stored along with the elevation information derived by electronic rod reader and field notebook 120. Additionally, the assistant using standard grade rod 110 can send photos to electronic rod reader and field notebook 120 of the location at which various reading were made to create a more complete, and more accurate, record of the locations at which reading were made. This removes some of the ambiguity previously associated with manually entered data which comprised field-books. For example, previously, notes appended to readings might indicate that the grade rod is located at the North-west corner of a building. This ambiguity can be problematic when trying to recreate the measurements later. However, adding photographs to the data file being recorded by electronic rod reader and field notebook 120 facilitates more clearly conveying exactly where measurements were taken, as well as other information in the notes which could be mis-interpreted.

Figure 2:
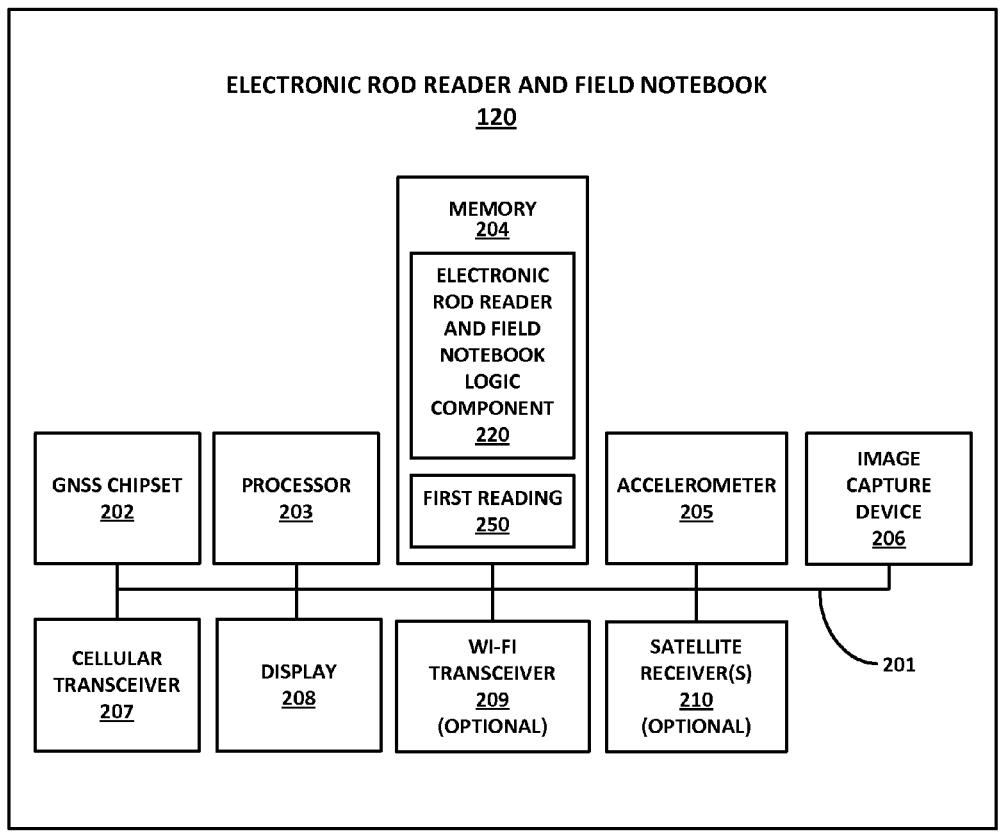
FIG. 2 depicts a block diagram of an example electronic rod reader and field notebook in accordance with at least one embodiment.

FIG. 2 depicts a block diagram of an example electronic rod reader and field notebook 120 in accordance with at least one embodiment. Examples of an electronic rod reader and field notebook 120 as shown in FIG. 2 comprise a non-voice enabled cellular device such as a position recording/reporting device, or a standard cellular telephone. The electronic rod reader and field notebook 120 includes a bus 201, a GNSS chipset 202 coupled with bus 201, a processor 203 coupled with bus 201 for processing information and instructions, a memory 204 coupled with bus 201 for storing information and instructions for processor 203. It is noted that memory 204 can comprise volatile memory and non-volatile memory, as well as removable data storage media in accordance with various embodiments. Examples of instructions are computer readable instructions for implementing an embodiment of electronic rod reader and field notebook logic component 220 that can be stored on a hardware memory 204 and that can be executed, for example, by the hardware processor 203. Other components of electronic rod reader and field notebook 120 comprise an accelerometer 205 coupled with bus 201, and an image capture device 206 coupled with bus 201.

In FIG. 2, electronic rod reader and field notebook 120 further comprises an image capture device 206 and a cellular transceiver 207 coupled with bus 201. Examples of image capture device 206 are a camera, a video camera, a digital camera, a digital video camera, a digital camcorder, a stereo digital camera, a stereo video camera, and a motion picture camera. The image capture device 206 may use a lens or be a pinhole type device.

According to various embodiments, cellular transceiver 207 is configured to permit communication via a cellular telephone network. Examples of cellular networks used by cellular transceiver 207 include, but are not limited to: GSM (Global System for Mobile Communications) cellular networks, GPRS (General Packet Radio Service) cellular networks, CDMA (Code Division Multiple Access) cellular networks, LTE (Long-Term Evolution), and EDGE (Enhanced Data rates for GSM Evolution) cellular networks, to name several. In accordance with at least one embodiment, cellular transceiver 207 is configured to operate on a satellite-based cellular network such as the Inmarsat or Iridium communication networks. In at least one embodiment, electronic rod reader and field notebook 120 is configured to receive GNSS corrections via a cellular network which are received by cellular transceiver 207. Similarly, using cellular transceiver 207, electronic rod reader and field notebook 120 can send or receive position data including position fixes to other devices either located proximate to electronic rod reader and field notebook 120 or at a distant location.

In the embodiment of FIG. 2, electronic rod reader and field notebook 120 further comprises a display 208. In accordance with various embodiments, display 208 comprises a touch screen display using capacitive or resistive sensors to determine the location of an object touching the screen and which can be interpreted as inputs for controlling operations by processor 203. In accordance with various embodiments, optional Wi-Fi transceiver 209 may be configured to operate on/in compliance with any suitable wireless communication protocol including, but not limited to: Wi-Fi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

Typically, global navigation satellites (not shown) provide radio navigation signals used by GNSS chipset 202 to determine the position of example electronic rod reader and field notebook 120. It is noted that the term "GNSS" refers to a variety of satellite navigation systems employed worldwide including, but not limited to, the Global Positioning System (GPS), the Globalnaya navigatsionnaya sputnikovaya sistema (GLONASS), the GALILEO satellite system, the BeiDou navigation satellite system, the Compass navigation satellite system, the Indian Region Navigation Satellite System (IRNSS), the Quasi-Zenith Satellite System (QZSS) navigation satellite system, or other implementations. According to one embodiment, the GNSS chipset 202 is configured to receive signals from GPS satellites, GLONASS satellites, Galileo satellites, or from a combination of satellites from different constellations of GNSS satellites. The GNSS chipset 202 can perform, for example, GPS measurements to derive raw measurement data for a position of the electronic rod reader and field notebook 120. The raw measurement data can provide an instant location (e.g., position fix) of the electronic rod reader and field notebook 120 which is output from GNSS chipset 202.

In accordance with one embodiment, GNSS chipset 202 comprises a low-cost chipset used by electronic rod reader and field notebook 120 which simply outputs a position fix of electronic rod reader and field notebook 120 based upon unsmoothed pseudoranges. In other words, in the interest of reducing costs, various features for improving the position fix are typically not built into a low-cost GNSS chipset such as GNSS chipset 202 including, but not limited to, pseudorange smoothing, carrier phase smoothing (e.g., based upon real carrier phase information, reconstructed carrier phase information). Alternatively, GNSS chipset 202 may incorporate features which facilitate determining a position fix of electronic rod reader and field notebook 120 with greater precision. For example, GNSS chipset 202 can comprise a Wide Area Augmentation System (WAAS) enabled receiver configured to receive broadcast WAAS corrections which can be used to improve the precision in determining the position of electronic rod reader and field notebook 120.

Improvements in GNSS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the reference station GNSS receivers can determine more precisely what the true pseudoranges should be to each satellite in view, based on geometrical considerations. For example, knowing the orbital positions of GPS satellites via the GPS almanac as a function of time enables this process with GPS positioning, first proposed in 1983, and widely adopted ever since. The difference between the observed pseudorange and the calculated pseudorange for a given reference station is called the pseudorange correction. A set of corrections for all the global navigation satellites in view is created second by second, and stored, and made available as a service, utilizing GNSS reference stations and correction services. The pseudoranges at both the electronic rod reader and field notebook 120 (e.g., GNSS chipset 202), and those at the reference stations are time-tagged, so the corrections for each and every pseudorange measurement can be matched to the local cell phone pseudoranges. With respect to a GPS implementation, the overall service is often referred to as Differential GPS, or DGPS. Again, with respect to a GPS implementation, without any corrections, GNSS receivers produce position fixes with absolute errors in position on the order of 4.5 m to 5.5 m per the GPS SPS Performance Standard, 4th Ed. 2008. In FIG. 2, one or more correction services convey these corrections via a cellular network, or the Internet. The Internet is in turn coupled with a local Wi-Fi network which can convey the corrections to electronic rod reader and field notebook 120 via Wi-Fi transceiver 209. Alternatively, a cellular network (not shown) can convey the corrections to electronic rod reader and field notebook 120 via cellular transceiver 207.

In accordance with various embodiments, a plurality of broadcast sources is used to convey data and media to electronic rod reader and field notebook 120. As an example, electronic rod reader and field notebook 120 can receive broadcast signals from communication satellites (e.g., two-way radio, satellite-based cellular such as the Inmarsat or Iridium communication networks, etc.) and global navigation satellites which provide radio navigation signals (e.g., the GPS, GNSS, GLONASS, GALILEO, BeiDou, Compass, etc.). In some embodiments, correction services are also coupled with a distribution service which conveys the corrections to a satellite radio distributor. The satellite radio distributor can broadcast corrections as a broadcast from one or more communications satellites. In some embodiments, electronic rod reader and field notebook 120 includes one or more integral satellite radio antennas associated with optional integrated satellite radio receiver(s) 210. Satellite radio receiver 210 is one example of such a satellite receiver which would employ an integrated antenna designed to operate in the correct frequency band for receiving a corrections or other information broadcast from communication satellites. In this manner, in some embodiments, electronic rod reader and field notebook 120 can receive the corrections via satellite radio receiver 210.

The blocks that represent features in FIG. 2 can be arranged differently than as illustrated, and can implement additional or fewer features than what are described herein. Further, the features represented by the blocks in FIG. 2 can be combined in various ways. Electronic rod reader and field notebook 120 can be implemented using software, hardware, hardware and software, hardware and firmware, or a combination thereof. Further, unless specified otherwise, various embodiments that are described as being a part of the electronic rod reader and field notebook 120, whether depicted as a part of the electronic rod reader and field notebook 120 or not, can be implemented using software, hardware, hardware and software, hardware and firmware, software and firmware, or a combination thereof. Various blocks in FIG. 2 refer to features that are logic, such as but not limited to electronic rod reader and field notebook logic component 220 can be implemented using software, hardware, hardware and software, hardware and firmware, software and firmware, or a combination thereof.

Figure 3:
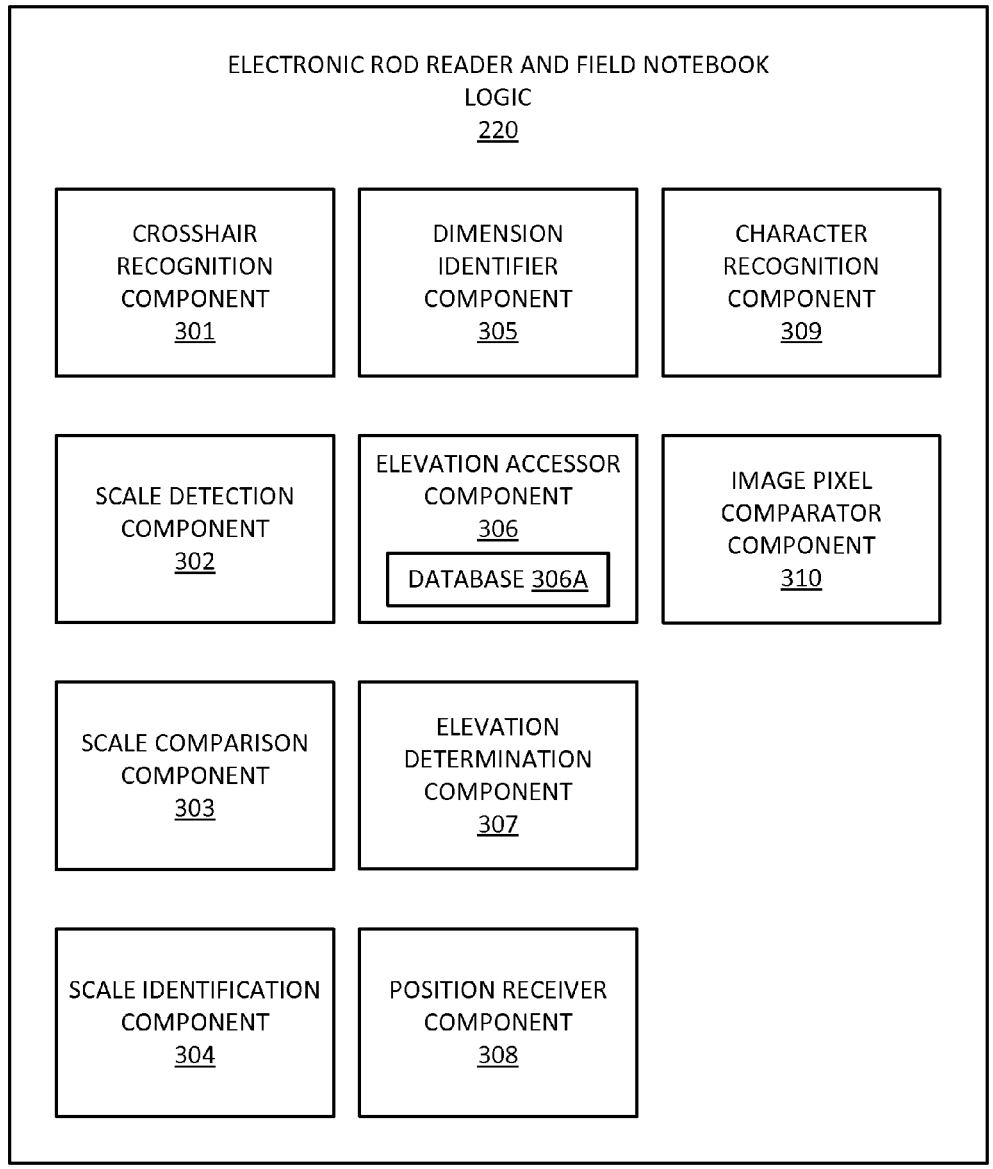
FIG. 3 is a diagram of components of an example electronic rod reader and field notebook logic component in accordance with various embodiments.
Figure 4:
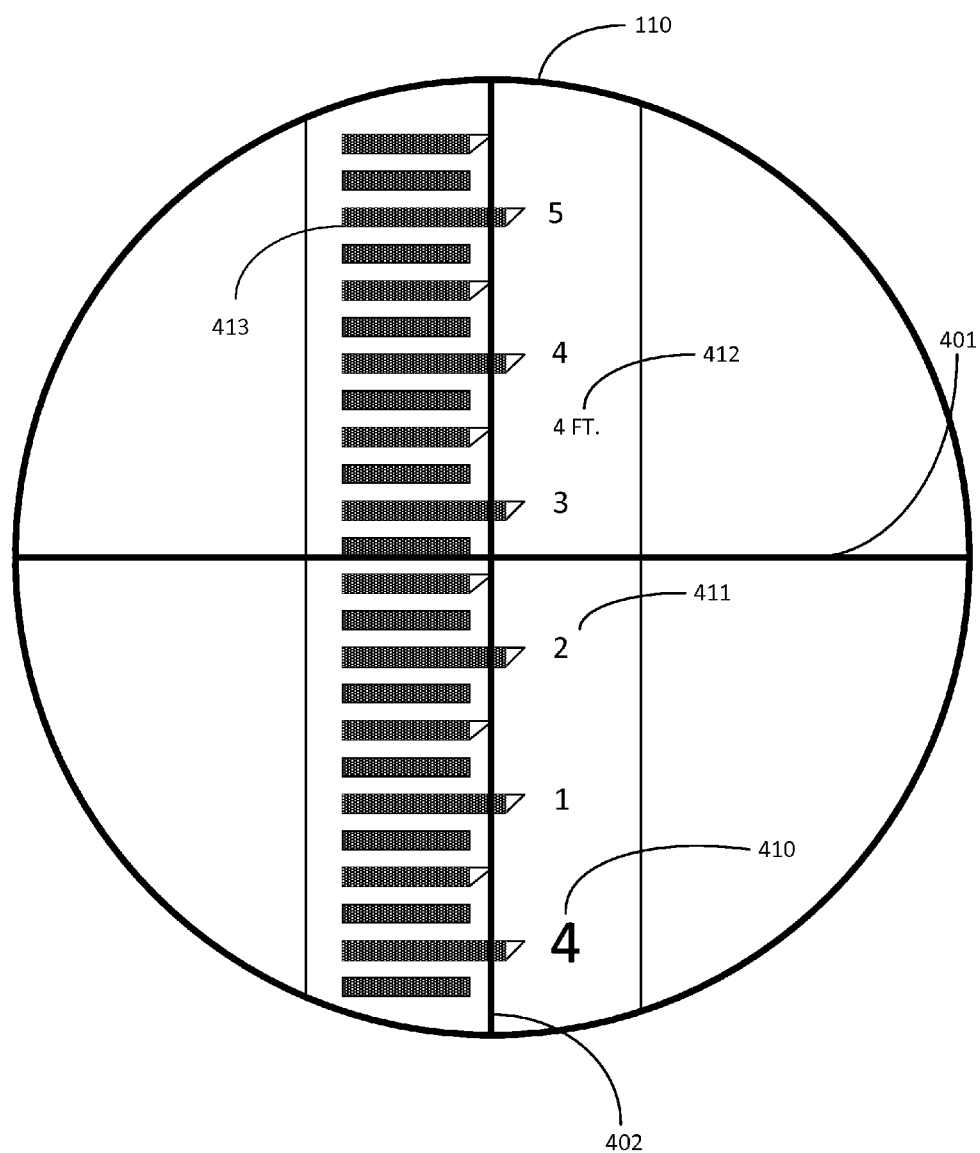
FIG. 4 shows an image captured by an image capture device of an electronic rod reader and field notebook in accordance with various embodiments.

FIG. 3 is a diagram of components of an example electronic rod reader and field notebook logic component 220 in accordance with various embodiments. In FIG. 3, electronic rod reader and field notebook logic component 220 comprises a crosshair recognition component 301. In accordance with various embodiments, electronic rod reader and field notebook 120 is configured to automatically recognize the crosshairs viewed through the eyepiece of an auto-level. In the present example, crosshair recognition component 301 is configured to recognize at least one (e.g., a horizontal crosshair 401 of FIG. 4) and, in some embodiments, two (e.g., horizontal crosshair 401 and vertical crosshair 402 of FIG. 4) crosshairs viewed through eyepiece 102 of auto-level 101. In FIG. 3, electronic rod reader and field notebook logic component 220 further comprises a scale detection component 302. In accordance with various embodiments, scale detection component 302 is configured to automatically recognize the markings of a scale displayed on standard grade rod 110. With reference again to FIG. 4, a plurality of hash marks 413 or bars are shown displayed on standard grade rod 110. Depending upon which type of standard grade rod is used, these hash marks 413 represent different distances. For example, a 10ths of a foot rod displays feet starting from zero and the hash marks 413 indicated 10ths of a foot, 100ths of a foot, etc. In the example of FIG. 4, it is noted that the width of each hash mark 413 is identical to the width of the space between hash marks 413. This makes it easier to determine fractions of an inch using auto-level 101. Another type of standard grade rod is shown in FIG. 4 and is known as a $\frac{1}{8}^{th}$ inch rod. In this type of rod, feet starting from zero are shown as well as inches, and $\frac{1}{8}$ths of an inch. Again, the width of each hash mark 413 is identical to the width of the space between hash marks 413. In the example of FIG. 4, the foot number (e.g., 410 in FIG. 4) indicates the 4 foot mark. The inch number (e.g., 411 of FIG. 4) indicates the two inch mark, or more specifically, a point 4 feet and 2 inches above the ground when the tip of standard grade rod 110 is placed at a location. Another type of standard grade rod is a metric grade rod which has markings for meters, decimeters, centimeters, etc.

In FIG. 3, electronic rod reader and field notebook logic component 220 further comprises a scale comparison component 303. In accordance with various embodiments, scale comparison component 303 is configured to compare horizontal crosshair 401 with the scale displayed on standard grade rod 110 by image capture device 206. In other words, scale comparison component 303 "reads" the value of the scale displayed on standard grade rod 110 by determining which value of the scale is co-planar with horizontal crosshair 401. In FIG. 3, electronic rod reader and field notebook logic component 220 further comprises a scale identification component 304. In accordance with various embodiments, scale identification component 304 automatically determines the scale displayed on standard grade rod 110. For example, the markings displayed on standard grade rod 110 are different depending upon which type of grade rod (e.g., metric, $\frac{1}{10}$th of a foot rod, $\frac{1}{8}$th of an inch rod, barcoded (e.g., computer-readable only) etc.) is being used. This is possible because the characters and hash marks 413 displayed on the rod will be different for each type of rod. In the example of FIG. 4, standard grade rod 110 displays characters 412 which indicate that the inch hash marks 413, and numbers proximate to them, are within the 4 foot range. This is necessary because the narrow field of view through auto-level 101 would obscure that information from a viewer for certain values displayed on the rod. Thus, the characters 412 are displayed so that a user can easily determine what value is being displayed. Similarly, a metric rod may have characters 412 which indicate meters and decimeters to facilitate reading values from standard grade rod 110. In accordance with various embodiments, character recognition component 309 can identify that some type of standard grade rod 110 is being used which uses feet or meters based upon the characters 412 that are read. Additionally, the pattern of hash marks 413 is different for a $\frac{1}{8}^{th}$ inch rod than the pattern for a $\frac{1}{10}^{th}$ foot rod or a metric rod. In accordance with various embodiments, scale identification component 304 can also recognize the pattern of hash marks 413 to facilitate automatically determining the type of standard grade rod 110 being used. Additionally, scale identification component 304 can utilize manually entered data which identifies the type of standard grade rod 110 being used. In accordance with some embodiments, scale identification component 304 can also recognize a barcode disposed on a barcoded (e.g., computer-readable only) standard grade rod to facilitate automatically determining the type of standard grade rod 110 being used.

In FIG. 3, electronic rod reader and field notebook logic component 220 further comprises a dimension identifier component 305. In accordance with various embodiments, dimension identifier component 305 completes the process of "reading" standard grade rod 110 using information received from scale comparison component 303 and scale identification component 304. In other words, scale comparison component 303 provides information as to which hash mark 413 is co-planar with horizontal crosshair 401 and scale identification component 304 provides information as to which type (e.g., metric, $\frac{1}{10}^{th}$ foot, $\frac{1}{8}^{th}$ inch, barcoded (e.g., computer-readable only) etc.) of standard grade rod 110 is being used. With this information, dimension identifier component 305 can make a reading of the dimension being read by auto-level 101. For example, in FIG. 4, horizontal crosshair 401 is co-planar with a hash mark 413 which indicates a dimension of 4 feet, 2 and $\frac{5}{8}^{ths}$ inches. This value is subtracted from the known elevation of auto-level 101. In FIG. 3, electronic rod reader and field notebook logic component 220 further comprises an elevation accessor component 306. In accordance with various embodiments, elevation accessor component 306 is configured to provide the elevation of point 105 at which standard grade rod 110 is set up. In accordance with various embodiments, elevation accessor component 306 comprises a database 306A of known benchmarks and their elevations. A user can manually enter the identifier of a particular benchmark and elevation accessor component 306 can automatically provide the elevation at that particular benchmark by looking up the corresponding elevation in database 306A. In accordance with various embodiments, elevation accessor component 306 can download the database prior to deploying auto-level 101 in the field. For example, a user can enter a location or job-site at which auto-level 101 is to be deployed and a set of benchmarks, and their corresponding elevations, proximate to that area will be automatically selected and downloaded into database 306A. In accordance with another embodiment, elevation accessor component 306 can access a position fix from GNSS chipset of the location at which auto-level 101 is currently located and perform a similar operation using, for example, cellular transceiver 207, or Wi-Fi transceiver 209. In another embodiment, elevation accessor component 306 can access manually entered data which specifies the elevation of the point 105 at which standard grade rod 110 is located.

In FIG. 3, electronic rod reader and field notebook logic component 220 further comprises an elevation determination component 307. In accordance with various embodiments, elevation determination component 307 performs the subtraction of the dimension determined by dimension identifier component 305 with the elevation of auto-level 101 to determine the reading of elevation when standard grade rod 110 is placed at a location and read by auto-level 101. In FIG. 3, electronic rod reader and field notebook logic component 220 further comprises a position receiver component 308. In accordance with various embodiments, position receiver component 308 is configured to receive a position fix from a GNSS equipped device located at the position of standard grade rod 110. Using this information, electronic rod reader and field notebook logic component 220 can create a complete record of location and elevation of each point at which standard grade rod 110 is read using auto-level 101. In FIG. 3, electronic rod reader and field notebook logic component 220 further comprises an image pixel comparator component 310. In accordance with various embodiments, image pixel comparator component 310 is configured to estimate a value when horizontal crosshair 401 is determined to be aligned between two hash marks 413. In other words, when horizontal crosshair 401 does not exactly lie upon an edge of one of hash marks 413, image pixel comparator component 310 is configured to estimate a value between the two adjacent hash marks 413. In accordance with various embodiments, image pixel comparator component 310 compares the number of image pixels of image capture device 206 between horizontal crosshair 401 and the hash mark 413 directly below horizontal crosshair 401 with the number of image pixels of image capture device 206 above horizontal crosshair 401 and the hash mark 413 directly above horizontal crosshair 401. Thus, electronic rod reader and field notebook logic component 220 can estimate a fraction measurement between adjacent hash marks 413 which can be used to further improve the precision of determining the elevation at the point at which standard grade rod 110 is located.

The blocks that represent features in FIG. 3 can be arranged differently than as illustrated, and can implement additional or fewer features than what are described herein. Further, the features represented by the blocks in FIG. 3 can be combined in various ways. Electronic rod reader and field notebook logic component 220 can be implemented using software, hardware, hardware and software, hardware and firmware, or a combination thereof. Further, unless specified otherwise, various embodiments that are described as being a part of the electronic rod reader and field notebook logic component 220, whether depicted as a part of the electronic rod reader and field notebook logic component 220 or not, can be implemented using software, hardware, hardware and software, hardware and firmware, software and firmware, or a combination thereof. Various blocks in FIG. 3 refer to features that are logic, such as but not limited to electronic rod reader and field notebook logic component 220 can be implemented using software, hardware, hardware and software, hardware and firmware, software and firmware, or a combination thereof.

FIG. 4 shows an image captured by an image capture device 206 of an electronic rod reader and field notebook 120 in accordance with various embodiments. As shown in FIG. 4, standard grade rod 110 is visible through the eyepiece 102 of auto-level 101. As described above, horizontal crosshair 401 and vertical crosshair 402 are visible, as are foot number 410 and inch numbers (e.g., 411 of FIG. 4). These are displayed on standard grade rod 110 to facilitate reading the elevation of the point at which standard grade rod 110 is located. As discussed above, characters 412 are displayed on standard grade rod 110 to facilitate determining what value is being displayed due to the narrow field of view of auto-level 101. As discussed above, the type of standard grade rod 110 shown in FIG. 4 is a $1/8^{ths}$ inch rod. Thus, the width of each hash mark 413, as well as the space between each hash mark 413, equals $1/8^{th}$ inch. However, it is noted that various embodiments are able to read other types of grade rods 110 such as, but not limited to, metric grade rods and $1/10^{th}$ foot rods as well.

Figure 5:
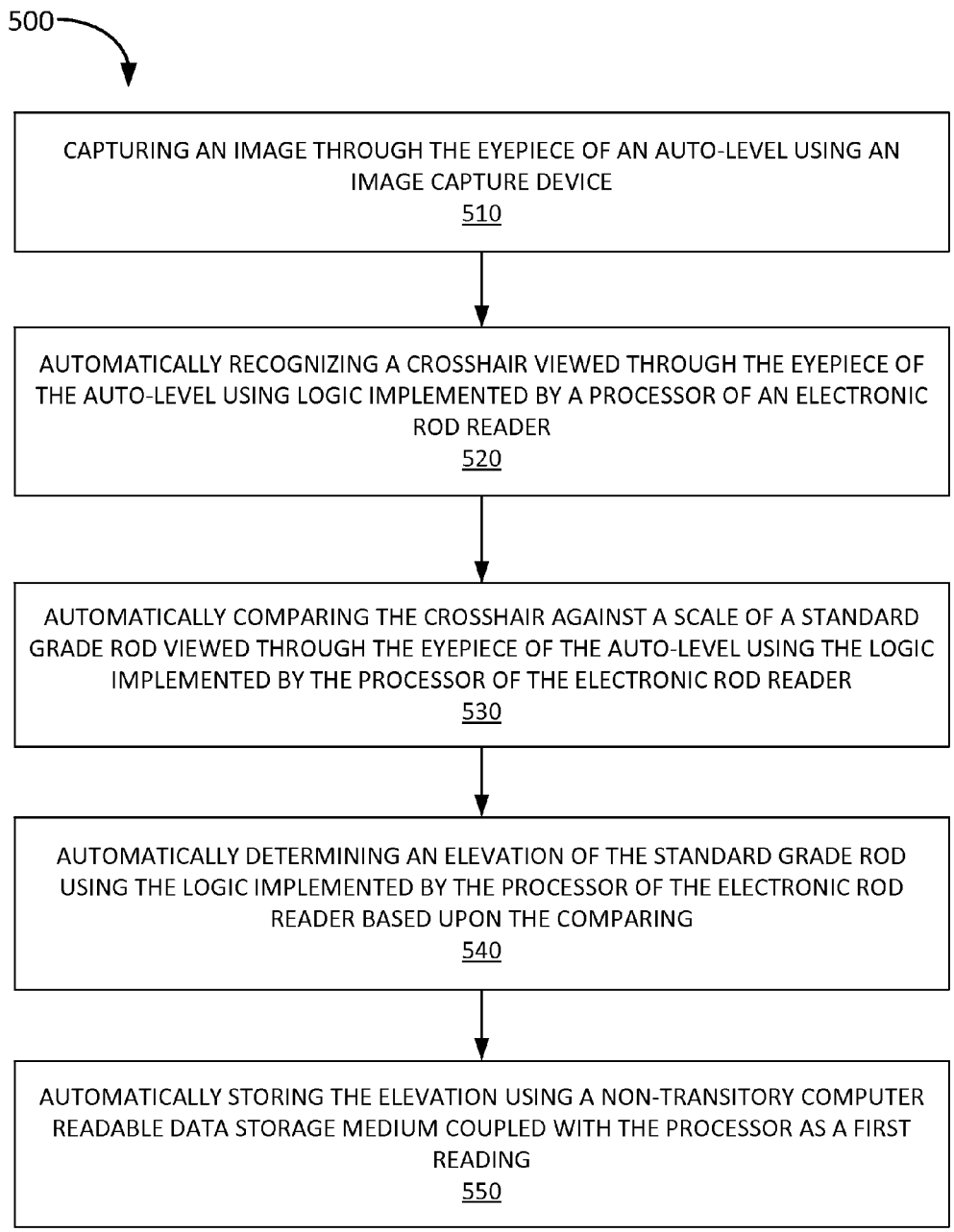
FIG. 5 is a flowchart of a method of automatically reading and recording auto-level readings in accordance with various embodiments.

FIG. 5 is a flowchart of a method 500 of automatically reading and recording auto-level readings in accordance with various embodiments. Method 500 includes some procedures that, in various embodiments, are carried out by one or more processors under the control of computer readable and computer-executable instructions. In this fashion, procedures described herein and in conjunction with method 500 are, or may be, implemented in an automated fashion using a computer, in various embodiments. The computer readable and computer executable instructions can reside in any non-transitory computer readable storage medium, such as, for example, in data storage features such as a Digital Versatile Disk (DVD), a Compact Disk (CD), peripheral computer readable storage media which may be removable, Random Access Memory (RAM), Read Only Memory (ROM), and an internal or removably couplable storage device or the like. The computer readable and computer-executable instructions, which reside on tangible, non-transitory computer readable storage media, are used to control or operate in conjunction with, for example, one or some combination of processor(s) 203, or other similar processor(s). Although specific procedures are disclosed in method 500, such procedures are examples. That is, embodiments are well suited to performing various other procedures or variations of the procedures recited in method 500. Likewise, in some embodiments, the procedures in method 500 may be performed in an order different than presented and/or not all of the procedures described may be performed. It is further appreciated that procedures described in method 500 may be implemented in hardware, or a combination of hardware with firmware and/or software.

In operation 510 of FIG. 5, an image is captured through the eyepiece of an auto-level using an image capture device. In accordance with various embodiments, a user can put the image capture device 206 of electronic rod reader and field notebook 120 up to the eyepiece 102 of auto-level 101. In accordance with various embodiments, the user can use display 208 to see what is being viewed by electronic rod reader and field notebook 120 through the eyepiece 102 of electronic rod reader and field notebook 120. In at least one embodiment, a user can make some indication, such as pressing display 208 to capture an image of what is being viewed through eyepiece 102 at that moment. In accordance with various embodiments, electronic rod reader and field notebook logic component 220 is configured to access that image and to perform the operations described above with reference to FIG. 3. It is noted that there is no necessity to capture an image of what is viewed through eyepiece 102 to perform the operations described above with reference to FIG. 3 in accordance with various embodiments. In accordance with various embodiments, this image, as well as other images, can become part of the file (e.g., first reading 250 of FIG. 2) stored in, for example, memory 204 of the elevation readings performed by auto-level 101. Additionally, position fixes from an electronic device located at or near standard grade rod 110 can be stored along with the image(s) captured by image capture device 206 as part of the file store in memory 204. Other images from the electronic device located at or near standard grade rod 110 can also be stored as part of the file which provide information such as the location of standard grade rod 110 relative to some local reference point.

In operation 520 of FIG. 5, a crosshair viewed through the eyepiece of said auto-level using is automatically recognized using logic implemented by a processor a an electronic rod reader. As described above, crosshair recognition component 301 is configured to recognize at least horizontal crosshair 401 via image capture device 206.

In operation 530 of FIG. 5, the crosshair is automatically compared against a scale of a standard grade rod viewed through the eyepiece of the auto-level using the logic implemented by the processor of the electronic rod reader. As described above with reference to FIG. 3, scale comparison component 303 compares the scale (e.g., foot numbers 410, inch numbers 411, characters 412, and hash marks 413 of FIG. 4) displayed on standard grade rod 110 with horizontal crosshair 410 to "read" which hash mark is co-planar with horizontal crosshair 401.

In operation 540 of FIG. 5, an elevation of the standard grade rod is automatically determined based upon the comparing of operation 530 using the logic implemented by the processor of the electronic rod reader. As described above, dimension identifier component 305 automatically determines the value of the hash mark 413, or an estimation of a value between adjacent hash marks 413, which is co-planar with horizontal crosshair 401. Furthermore, this dimension is used by elevation determination component 307 to determine the elevation of the point at which standard grade rod 110 is located by adding the dimension determined by dimension identifier component 305 with the elevation of auto-level 101.

In operation 550 of FIG. 5, the elevation is automatically stored as a first reading using a non-transitory computer readable data storage medium coupled with the processor. In accordance with various embodiments, electronic rod reader and field notebook 120 automatically stores the elevation of the location at which standard grade rod 110 is located (e.g., first reading 250 of FIG. 2) on a non-transitory computer readable data storage medium. As discussed above, additional information such as a position fix of the location at which standard grade rod 110 is located can be automatically appended to the elevation information for that point. Additionally, images captured by electronic rod reader and field notebook 120 and/or electronic devices co-located with standard grade rod 110 can be appended to the file (e.g., first reading 250 of FIG. 2).

In accordance with various embodiments, electronic rod reader and field notebook 120 comprises a portable electronic device which is not originally configured to be used as a surveying device, or to perform the operations described above with reference to FIGS. 3 and 5. In at least one embodiment, electronic rod reader and field notebook 120 comprises a cellular telephone. As described above, electronic rod reader and field notebook 120 comprises a wireless communication device configured for receiving a position (e.g., derived from a GNSS device) of standard grade rod 110 when an elevation reading is made in accordance with various embodiments. This position information can be automatically stored with the elevation reading to provide a more complete set of data. In accordance with various embodiments, the type of scale (e.g., metric, $\frac{1}{10}^{th}$ foot, $\frac{1}{8}^{th}$ inch, etc.) can be automatically determined electronic rod reader and field notebook logic component 220. In addition to automatically determining which of a variety human readable scales is being viewed, in some embodiments, another type scale which is only intended to be machine readable (e.g., barcoded) can be automatically determined. Alternatively, this information can be manually entered by a user. Furthermore, electronic rod reader and field notebook logic component 220 is configured to automatically recognize characters shown on standard grade rod 110 using character recognition component 309. Furthermore, electronic rod reader and field notebook logic component 220 is capable of automatically recognizing the type of standard grade rod 110 (e.g., metric, $\frac{1}{10}^{th}$ foot, $\frac{1}{8}^{th}$ inch, etc.) is being viewed via auto-level 101. Additionally, in some embodiments, electronic rod reader and field notebook logic component 220 is capable of automatically recognizing the type of barcoded standard grade rod 110 being viewed via auto-level 101. As discussed above, electronic rod reader and field notebook logic component 220 comprises an image pixel comparator component 310 which is configured to estimate a value when horizontal crosshair 401 is determined to lie between two adjacent hash marks 413. In accordance with various embodiments, electronic rod reader and field notebook 120 can be used for other tasks than simply collecting elevations and position fixes. In accordance with at least one embodiment, electronic rod reader and field notebook 120 can estimate the volume of, for example, a mound of soil by taking successive position fixes and elevations. For example, a series of elevations and position fixes can be taken which define a periphery of a mound of soil. Then, successive position fixes and elevations of the mound itself can be made and an estimate of the volume of the mound of soil can be performed using, for example, processor 203. In accordance with various embodiments, the data collected by electronic rod reader and field notebook 120 can be sent in real-time to a remote location such as an office using, for example, cellular transceiver 207, or Wi-Fi transceiver 209.

Figure 6:
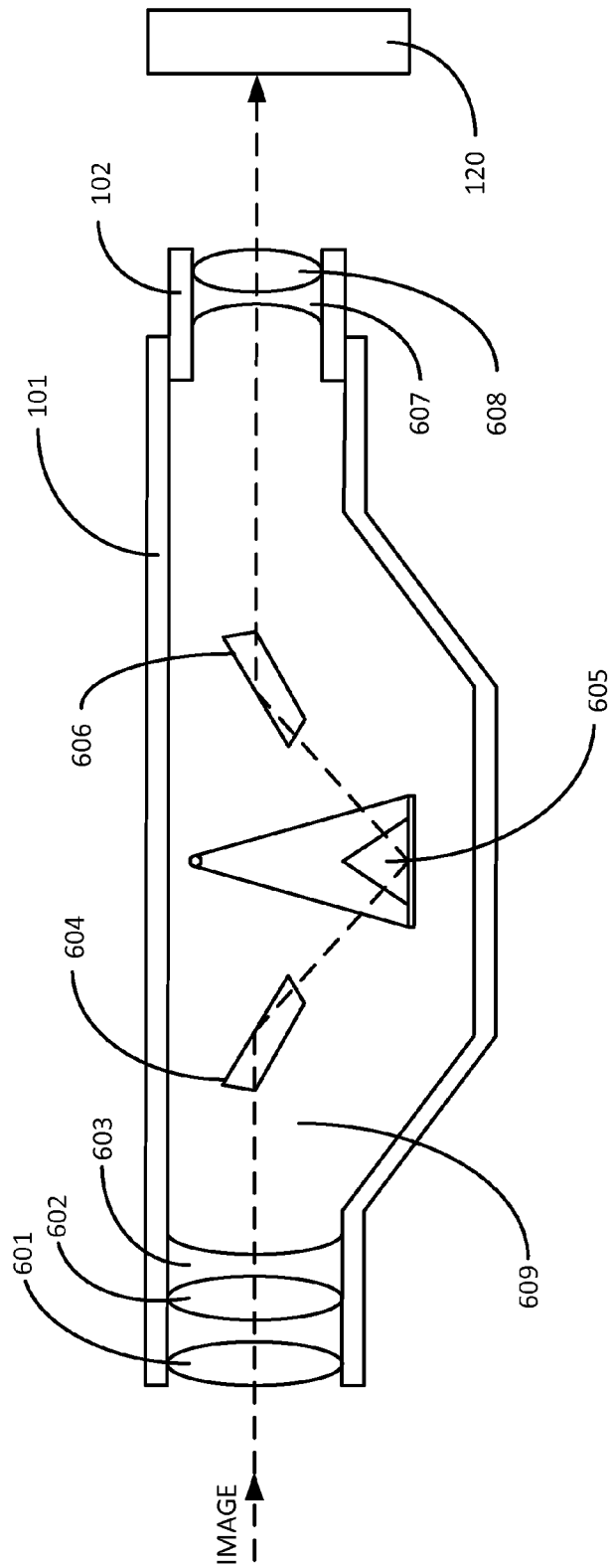
FIG. 6 is a cross-sectional view of an example auto-level in accordance with various embodiments.

FIG. 6 is a cross-sectional view of an example auto-level in accordance with various embodiments. In FIG. 6, auto-level 101 comprises a plurality of lenses (e.g., 601, 602, 603, 607, and 608) and prisms (e.g., 604, 605, and 606) of a telescope 609 which are used to manipulate the light path of an image being viewed. It is noted that the lenses and prisms shown in FIG. 6 are meant to be understood as representative rather than a literal representation of the arrangement of lenses and prisms in an auto-level. As shown in FIG. 6, and as is the case in most standard auto-levels, prism 605 is suspended as a pendulum and is allowed to swing freely within auto-level 101. This permits auto-level 101 to self-level to a certain degree and removes the necessity to absolutely emplace auto-level 101 as truly level with respect to the Earth's gravitational pull. As shown in FIG. 6 electronic rod reader and field notebook 120 is positioned behind eyepiece 102 in a manner to capture the image(s) viewed through eyepiece 102.

Integrated Auto-Level and Electronic Rod Reader

Figure 7:
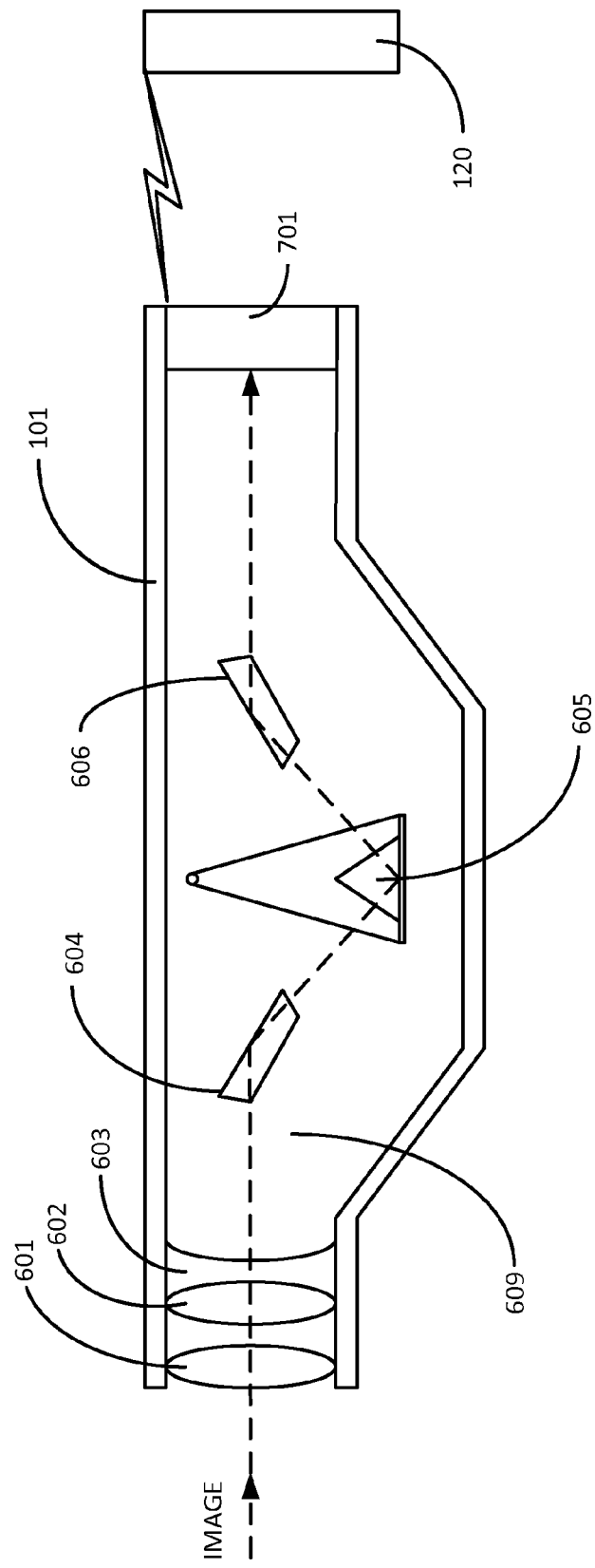
FIG. 7 is a cross-sectional view of an example auto-level in accordance with various embodiments.

FIG. 7 is a cross-sectional view of an example auto-level in accordance with various embodiments. In the embodiment of FIG. 7, eyepiece 102 has been removed from auto-level 101 and has been replaced with an image delivery device 701. In accordance with various embodiments, image delivery device 701 is configured to capture an image through auto-level 101 and to transmit that image, either via a wireless or wired data connection, to electronic rod reader and field notebook 120. In other words, rather than performing the processing of a captured image such as reading the scale of standard grade rod 110 and determining the elevation thereof, image delivery device 701 simply conveys the image it "sees" and captures through the telescope 609 of auto-level 101 and conveys that image to electronic rod reader and field notebook 120 where additional processing (e.g., automatically recognizing standard grade rod 110, automatically comparing a crosshair against the scale of standard grade rod 110, automatically determining the elevation of standard grade rod 110, and automatically storing the elevation of standard grade rod 110) of the image takes place. It is noted that in FIG. 7, image delivery device 701 is integrated into auto-level 101. In accordance with at least one embodiment, all or a portion of the eyepiece (e.g., 102 of FIG. 1) of auto-level 101 can be removed (e.g., unscrewed from auto-level 101) and image delivery device 701 can replace all or a portion of eyepiece 102. In accordance with at least one embodiment, image delivery device 701 is configured to correct the image through telescope 609 to compensate for optical devices (e.g., lenses 607 and 608 of FIG. 6) which may be removed when eyepiece 102 is removed from auto-level 101. Additionally, in accordance with at least one embodiment, image delivery device 701 will overlay a crosshair (e.g., 401 of FIG. 4) onto the image. In so doing, the embodiment shown in FIG. 7 integrates the capability to read standard grade rods within an auto-level without the necessity of purchasing expensive, purpose-built, electronic auto-levels which lack the capability of reading standard grade rods. Furthermore, as will be discussed in greater detail below, one embodiment of image delivery device 701 comprises a display device (e.g., 1006 of FIG. 10) which permits a user to view what image is visible through telescope 609 of auto-level 101, as opposed to many auto-levels which have a device that only displays the elevations being read from a barcode (e.g., computer-readable only) grade rod.

Figure 8:
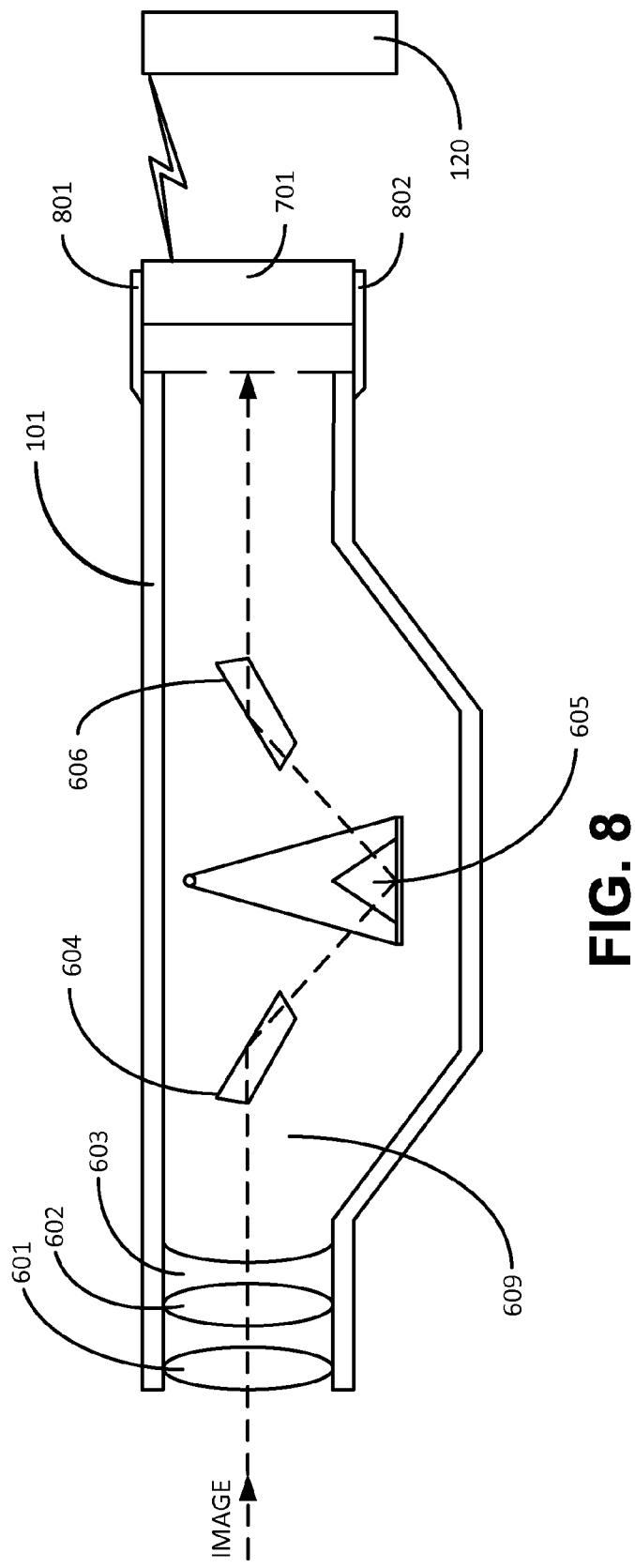
FIG. 8 is a cross-sectional view of an example auto-level in accordance with various embodiments.

FIG. 8 is a cross-sectional view of an example auto-level in accordance with various embodiments. In FIG. 8, rather than integrating image delivery device 701 into auto-level 101, it is attached to auto-level 101 using brackets 801 and 802. In the embodiment shown in FIG. 8, image delivery device 701 is configured to capture an image through telescope 609. Again, in accordance with at least one embodiment image delivery device 701 is configured to correct the image through telescope 609 to compensate for optical devices (e.g., lenses 607 and 608 of FIG. 6) which are removed when eyepiece 102 is removed from auto-level 101. As shown in FIG. 8, image delivery device 701 communicates with electronic rod reader and field notebook 120 using a wireless communication link. However, it is noted that in accordance with various embodiments image delivery device 701 can also implement a wired communication channel with other devices including electronic rod reader and field notebook 120. In accordance with various embodiments, having received the image visible through telescope 609, electronic rod reader and field notebook 120 performs the processing of that image to determine the elevation of standard grade rod 110. In accordance with various embodiments, this processing includes, but is not limited to, automatically recognizing standard grade rod 110, automatically comparing a crosshair against the scale of standard grade rod 110, automatically determining the elevation of standard grade rod 110, and automatically storing the elevation of standard grade rod 110.

Figure 9:
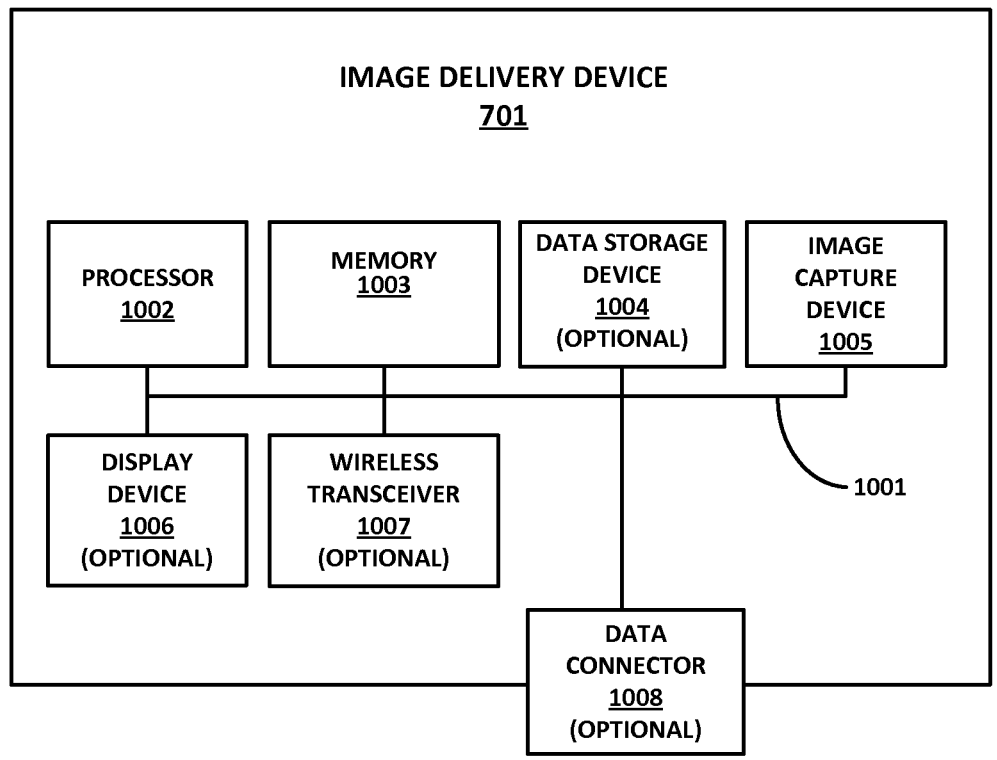
FIG. 9 is a block diagram of an example image capture device in accordance with various embodiments.

FIG. 9 depicts a block diagram of an example image delivery device 701 in accordance with at least one embodiment. The image delivery device 701 includes a bus 1001, a processor 1002 coupled with bus 1001 for processing information and instructions, a memory 1003 coupled with bus 1001 for storing information and instructions for processor 1002. It is noted that memory 1003 can comprise volatile memory and/or non-volatile memory, as well as removable data storage media in accordance with various embodiments.

In the embodiment shown in FIG. 9, image delivery device 701 further comprises an optional data storage device 1004. In accordance with various embodiments, data storage device 1004 comprises non-volatile storage such as a RAM or ROM, or some other computer readable memory device or media such as a removable data storage device. Examples of removable data storage devices in accordance with various embodiments include, but are not limited to, implementations of the CompactFlash format of data storage devices, implementations of the SmartMedia format of data storage devices, implementations of the SecureDigital format of data storage devices, and implementations of Universal Serial Bus (USB) format of data storage devices. In accordance with various embodiments, data storage device 1004 can be used to store images of standard grade rod 110 until confirmation of receipt of those images is received from another device such as electronic rod reader and field notebook 120.

In FIG. 9, an image capture device 1005 is coupled with bus 1001. Examples of image capture device 1005 are a camera, a video camera, a digital camera, a digital video camera, a digital camcorder, a stereo digital camera, a stereo video camera, and a motion picture camera. The image capture device 1005 may use a lens or be a pinhole type device.

According to various embodiments, an optional wireless transceiver 1007 is configured to permit communication with other devices such as electronic rod reader and field notebook 120. In accordance with one embodiment, wireless transceiver 1007 communicates with electronic rod reader and field notebook 120 via a cellular telephone network. Examples of cellular networks used by wireless transceiver 1007 include, but are not limited to: GSM cellular networks, GPRS cellular networks, CDMA cellular networks, and EDGE cellular networks. In accordance with at least one embodiment, wireless transceiver 1007 is configured to operate on a satellite-based cellular network such as the Inmarsat or Iridium communication networks. In accordance with various embodiments, optional wireless transceiver 209 may be configured to operate on/in compliance with any suitable wireless communication protocol including, but not limited to: Wi-Fi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

In the embodiment of FIG. 9, image delivery device 701 further comprises an optional display 1006. In accordance with various embodiments, display 1006 comprises a touch screen display using capacitive or resistive sensors to determine the location of an object touching the screen and which can be interpreted as inputs for controlling operations by processor 1002.

Image delivery device 701 also includes an optional data connector 1008 for coupling image delivery device 701 with other devices such as electronic rod reader and field notebook 120. For example, in one embodiment data connector 1008 is a serial data port, or a parallel data port, for enabling wired communications between external image delivery device 701 and electronic rod reader and field notebook 120. More specifically, in various embodiments, data connector 1008 can be used to couple image delivery device 701 with electronic rod reader and field notebook 120 for the exchange of data comprising an image(s) viewed through telescope 609 of auto-level 101.

The blocks that represent features in FIG. 9 can be arranged differently than as illustrated, and can implement additional or fewer features than what are described herein. Further, the features represented by the blocks in FIG. 9 can be combined in various ways. Image delivery device 701 can be implemented using software, hardware, hardware and software, hardware and firmware, or a combination thereof. Further, unless specified otherwise, various embodiments that are described as being a part of the image delivery device 701, whether depicted as a part of the image delivery device 701 or not, can be implemented using software, hardware, hardware and software, hardware and firmware, software and firmware, or a combination thereof.

Figure 10:
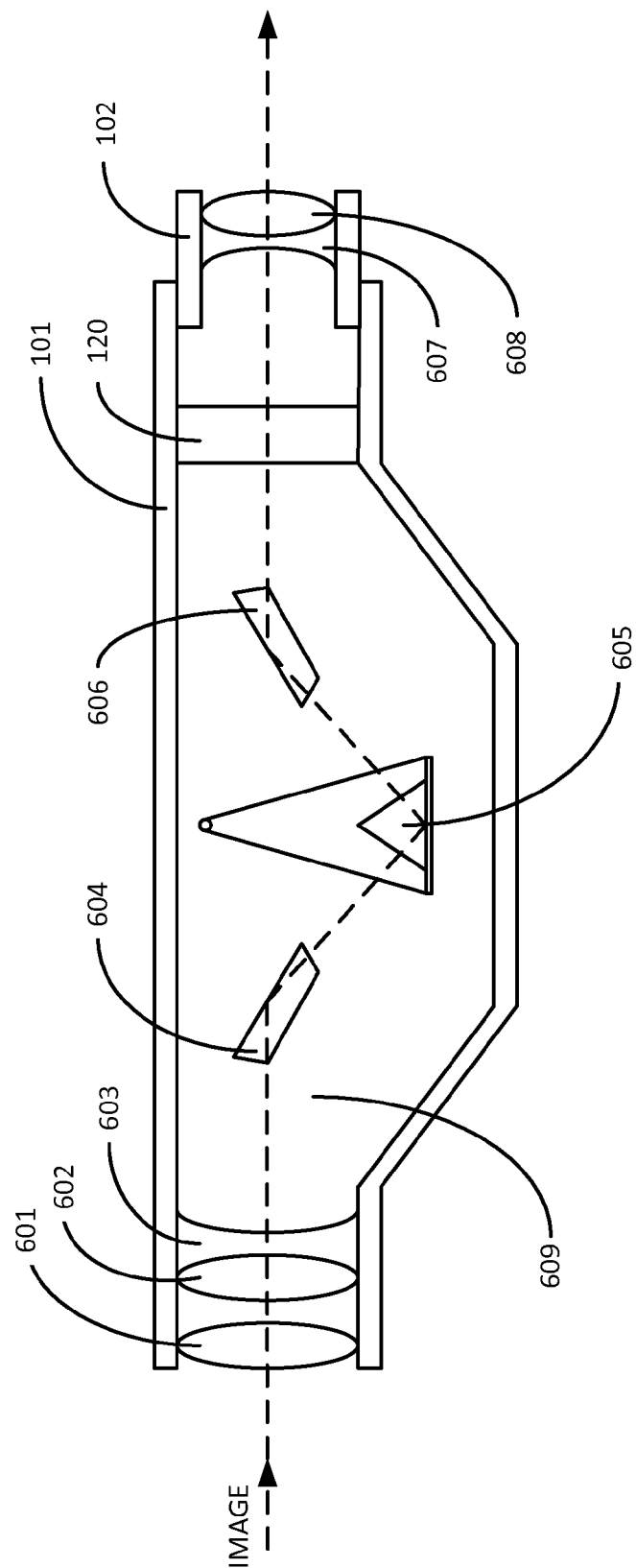
FIG. 10 is a cross-sectional view of an example auto-level in accordance with various embodiments.

FIG. 10 is a cross-sectional view of an example auto-level in accordance with various embodiments. In the embodiment shown in FIG. 10, electronic rod reader and field notebook 120 is disposed within auto-level 101 before an image reaches eyepiece 102. In accordance with at least one embodiment, electronic rod reader and field notebook 120 will allow images to pass through to eyepiece 102 to permit a user to manually aim and operate auto-level 101. However, when a user wants to read an elevation of standard grade rod 110, the user can, for example, initiate electronic rod reader and field notebook 120 which causes it to divert the image to image capture device 206. In accordance with one embodiment, this is accomplished using an electronic shutter disposed within electronic rod reader and field notebook 120. For example, a mirror and prism system may be utilized, in a similar manner to a single-lens reflex (SLR) camera so that a user may view an image through the eyepiece 102 and the same image may then be diverted to image capture device 206 for capture of the image.

Figure 11:
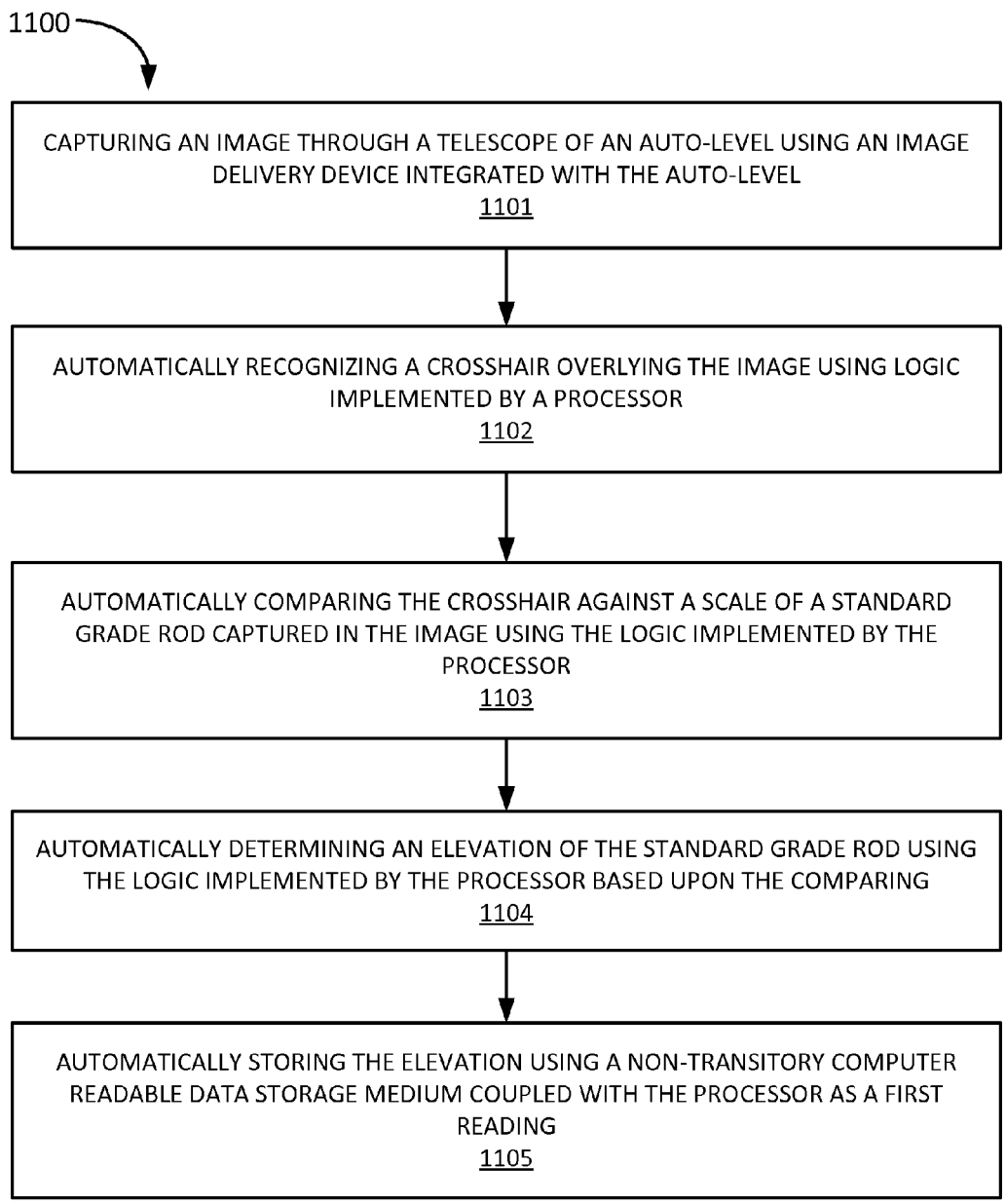
FIG. 11 is a flowchart of a method of automatically reading and recording auto-level readings in accordance with various embodiments.

FIG. 11 is a flowchart of a method 1100 of automatically reading and recording auto-level readings in accordance with various embodiments. In operation 1101 of FIG. 11, an image is captured through a telescope of an auto-level using an image delivery device integrated with the auto-level. As discussed above, in accordance with various embodiments, an image is captured through the telescope (e.g., 609) of auto-level 101. This includes, but is not limited to, using electronic rod reader and field notebook 120 to capture an image as shown in FIGS. 6 and 10. Alternatively, as shown in FIGS. 7 and 8, an image delivery device 701 can be used to capture the image and convey it to another device (e.g., a portable electronic device, cellular telephone, electronic rod reader and field notebook 120, etc.). In accordance with various embodiments, the image can be conveyed from image delivery device 701 to another device using a wired or wireless communication link (e.g., using wireless transceiver 1007 of FIG. 10).

In operation 1102 of FIG. 11, a crosshair overlying the image is automatically recognized using logic implemented by a processor. As described above, crosshair recognition component 301 is configured to recognize at least horizontal crosshair 401 via image capture device 206. In accordance with various embodiments, the processor (e.g., 203 of FIG. 2) can be separate from the device which captures the image (e.g., image capture device 1005 of FIG. 10), or a component of the device (e.g., electronic rod reader and field notebook 120) comprising the image capture device (e.g., 206 of FIG. 2). In accordance with at least one embodiment, the crosshair 401 is overlaid the image through telescope 609 by image delivery device 701.

In operation 1103 of FIG. 11, the crosshair is automatically compared against a scale of a standard grade rod captured in the image using the logic implemented by the processor. As described above with reference to FIG. 3, scale comparison component 303 compares the scale (e.g., foot numbers 410, inch numbers 411, characters 412, and hash marks 413 of FIG. 4) displayed on standard grade rod 110 with horizontal crosshair 410 to "read" which hash mark is co-planar with horizontal crosshair 401.

In operation 1104 of FIG. 11, an elevation of said standard grade rod is automatically determined using the logic implemented by the processor based upon the comparing. As described above, dimension identifier component 305 automatically determines the value of the hash mark 413, or an estimation of a value between adjacent hash marks 413, which is co-planar with horizontal crosshair 401. Furthermore, this dimension is used by elevation determination component 307 to determine the elevation of the point at which standard grade rod 110 is located by adding the dimension determined by dimension identifier component 305 with the elevation of auto-level 101.

In operation 1105 of FIG. 11, the elevation is automatically stored using a non-transitory computer readable data storage medium coupled with the processor as a first reading. In accordance with various embodiments, electronic rod reader and field notebook 120 automatically stores the elevation of the location at which standard grade rod 110 is located (e.g., first reading 250 of FIG. 2) on a non-transitory computer readable data storage medium. As discussed above, additional information such as a position fix of the location at which standard grade rod 110 is located can be automatically appended to the elevation information for that point. Additionally, images captured by electronic rod reader and field notebook 120 and/or electronic devices co-located with standard grade rod 110 can be appended to the file (e.g., first reading 250 of FIG. 2).

In accordance with various embodiments, electronic rod reader and field notebook 120 comprises a portable electronic device which is not originally configured to be used as a surveying device, or to perform the operations described above with reference to FIGS. 3 and 5. In at least one embodiment, electronic rod reader and field notebook 120 comprises a cellular telephone. As described above, electronic rod reader and field notebook 120 comprises a wireless communication device configured for receiving a position (e.g., derived from a GNSS device) of standard grade rod 110 when an elevation reading is made in accordance with various embodiments. This position information can be automatically stored with the elevation reading to provide a more complete set of data. In accordance with various embodiments, the type of scale (e.g., metric, $\frac{1}{10}^{th}$ foot, $\frac{1}{8}^{th}$ inch, etc.) can be automatically determined electronic rod reader and field notebook logic component 220. Alternatively, this information can be manually entered by a user. Furthermore, electronic rod reader and field notebook logic component 220 is configured to automatically recognize characters shown on standard grade rod 110 using character recognition component 309. Furthermore, electronic rod reader and field notebook logic component 220 is capable of automatically recognizing the type of standard grade rod 110 (e.g., metric, $\frac{1}{10}^{th}$ foot, $\frac{1}{8}^{th}$ inch, etc.) is being viewed via auto-level 101. As discussed above, electronic rod reader and field notebook logic component 220 comprises an image pixel comparator component 310 which is configured to estimate a value when horizontal crosshair 401 is determined to lie between two adjacent hash marks 413. In accordance with various embodiments, electronic rod reader and field notebook 120 can be used for other tasks than simply collecting elevations and position fixes. In accordance with at least one embodiment, electronic rod reader and field notebook 120 can estimate the volume of, for example, a mound of soil by taking successive position fixes and elevations. For example, a series of elevations and position fixes can be taken which define a periphery of a mound of soil. Then, successive position fixes and elevations of the mound itself can be made and an estimate of the volume of the mound of soil can be performed using, for example, processor 203. In accordance with various embodiments, the data collected by electronic rod reader and field notebook 120 can be sent in real-time to a remote location such as an office using, for example, cellular transceiver 207, or Wi-Fi transceiver 209.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. An electronic rod reader and field notebook comprising:
    an image capture device for capturing an image through an eyepiece of an auto-level;
    logic implemented by a processor of said electronic rod reader for automatically recognizing a crosshair viewed through said eyepiece of said auto-level, for automatically comparing said crosshair against a scale of a standard grade rod viewed through said eyepiece of said auto-level, and for automatically determining an elevation of said standard grade rod based upon said comparing; and
    a non-transitory computer readable data storage medium coupled with said processor for storing said elevation as a first reading.

2. The electronic rod reader and field notebook of claim 1 wherein said image capture device, said processor, and said non-transitory computer readable data storage medium comprise components of a portable electronic device which is not originally configured to be used as a surveying device.

3. The electronic rod reader and field notebook of claim 2 wherein said image capture device, said processor, and said non-transitory computer readable data storage medium comprise components of a cellular telephone.

4. The electronic rod reader and field notebook of claim 2 further comprising:
    a wireless communication device configured for receiving a position of said standard grade rod and wherein said logic causes said position to be automatically stored with said first reading.

5. The electronic rod reader and field notebook of claim 1 wherein said logic implemented by said processor facilitates automatically recognizing a character shown on said standard grade rod by said electronic rod reader and field notebook.

6. The electronic rod reader and field notebook of claim 1 wherein said logic implemented by said processor facilitates automatically determining a type of said standard grade rod viewed through the eyepiece of said auto-level by said electronic rod reader and field notebook.

7. The electronic rod reader and field notebook of claim 1 wherein said logic implemented by said processor is configured to estimate a value of said standard grade rod by counting image pixels between the crosshair of the auto-level and said scale of said standard grade rod.

8. A method of automatically reading and recording auto-level readings, said method comprising:
    capturing an image through an eyepiece of an auto-level using an image capture device;
    automatically recognizing a crosshair viewed through said eyepiece of said auto-level using logic implemented by a processor of an electronic rod reader;
    automatically comparing said crosshair against a scale of a standard grade rod viewed through said eyepiece of said auto-level using said logic implemented by said processor of said electronic rod reader;
    automatically determining an elevation of said standard grade rod using said logic implemented by said processor of said electronic rod reader based upon said comparing; and
    automatically storing said elevation using a non-transitory computer readable data storage medium coupled with said processor as a first reading.

9. The method of claim 8 further wherein said image capture device, said processor, and said non-transitory computer readable data storage medium comprise components of a portable electronic device which is not originally configured to be used as a surveying device, said method further comprising:
    using said portable electronic device to perform said capturing, said automatically recognizing, said automatically comparing, said automatically determining, and said automatically storing.

10. The method of claim 9 wherein said image capture device, said processor, and said non-transitory computer readable data storage medium comprise components of a cellular telephone, said method further comprising:
    using said cellular telephone to perform said capturing, said automatically recognizing, said automatically comparing, said automatically determining, and said automatically storing.

11. The method of claim 9 further comprising:
    receiving a position of said standard grade rod using a wireless communication device of said portable electronic device; and
    automatically storing said position with said first reading.

12. The method of claim 8 further comprising:
    automatically recognizing a character shown on said standard grade rod.

13. The method of claim 8 further comprising:
    automatically determining a type of said standard grade rod viewed through the eyepiece of said auto-level.

14. The method of claim 8 further comprising:
    automatically estimating a value of said standard grade rod by counting image pixels between the crosshair of the auto-level and said scale of said standard grade rod.

15. A non-transitory computer readable storage medium having computer readable instructions stored thereon for causing a computer system to perform a method of automatically reading and recording auto-level readings, said method comprising:
    capturing an image through an eyepiece of an auto-level using an image capture device;
    automatically recognizing a crosshair viewed through said eyepiece of said auto-level using logic implemented by a processor of an electronic rod reader;
    automatically comparing said crosshair against a scale of a standard grade rod viewed through said eyepiece of said auto-level using said logic implemented by said processor of said electronic rod reader;
automatically recognizing a character shown on said standard grade rod;
automatically determining an elevation of said standard grade rod using said logic implemented by said processor of said electronic rod reader based upon said comparing; and
automatically storing said elevation using a non-transitory computer readable data storage medium coupled with said processor as a first reading.

16. The non-transitory computer readable storage medium of claim 15 further wherein said image capture device, said processor, and said non-transitory computer readable data storage medium comprise components of a portable electronic device which is not originally configured to be used as a surveying device, and wherein said method further comprises:
using said portable electronic device to perform said capturing, said automatically recognizing, said automatically comparing, said automatically determining, and said automatically storing.

17. The non-transitory computer readable storage medium of claim 16 wherein said image capture device, said processor, and said non-transitory computer readable data storage medium comprise components of a cellular telephone, and wherein said method further comprises:
using said cellular telephone to perform said capturing, said automatically recognizing, said automatically comparing, said automatically determining, and said automatically storing.

18. The non-transitory computer readable storage medium of claim 16, wherein said method further comprises:
receiving a position of said standard grade rod using a wireless communication device of said portable electronic device; and
automatically storing said position with said first reading.

19. The non-transitory computer readable storage medium of claim 15, wherein said method further comprises:
automatically determining a type of said standard grade rod viewed through said eyepiece of said auto-level.

20. The non-transitory computer readable storage medium of claim 15, wherein said method further comprises:
automatically estimating a value of said standard grade rod by counting image pixels between the crosshair of the auto-level and said scale of said standard grade rod.

* * * * *